(12) United States Patent
Oishi et al.

(10) Patent No.: US 10,132,346 B2
(45) Date of Patent: Nov. 20, 2018

(54) HALVED OUTER RING, ROLLER BEARING, AND ROTARY SUPPORT STRUCTURE

(75) Inventors: Shinji Oishi, Iwata (JP); Yugo Yoshimura, Iwata (JP); Katsufumi Abe, Iwata (JP)

(73) Assignee: NTN CORPORATION, Osaka (JP)

( * ) Notice: Subject to any disclaimer, the term of this patent is extended or adjusted under 35 U.S.C. 154(b) by 9 days.

(21) Appl. No.: 13/203,001

(22) PCT Filed: Feb. 18, 2010

(86) PCT No.: PCT/JP2010/052408
§ 371 (c)(1),
(2), (4) Date: Aug. 24, 2011

(87) PCT Pub. No.: WO2010/103899
PCT Pub. Date: Sep. 16, 2010

(65) Prior Publication Data
US 2012/0008893 A1    Jan. 12, 2012

(30) Foreign Application Priority Data

Mar. 11, 2009 (JP) .................................. 2009-057821
Mar. 11, 2009 (JP) .................................. 2009-057822

(51) Int. Cl.
*F16C 33/46* (2006.01)
*F16C 9/02* (2006.01)
(Continued)

(52) U.S. Cl.
CPC ............... *F16C 9/02* (2013.01); *F16C 19/46* (2013.01); *F16C 33/588* (2013.01); *F16C 33/60* (2013.01);
(Continued)

(58) Field of Classification Search
USPC ............... 384/499, 548, 569, 570, 584, 585
See application file for complete search history.

(56) References Cited

U.S. PATENT DOCUMENTS 1,921,488 A    8/1933  Smith
2,937,061 A *  5/1960  Folkerts .................. 277/468
(Continued)

FOREIGN PATENT DOCUMENTS

CN        101137853      3/2008
JP        2002-525533    8/2002
(Continued)

*Primary Examiner* — Richard W Ridley
*Assistant Examiner* — Brian J McGovern
(74) *Attorney, Agent, or Firm* — Clark & Brody

(57) ABSTRACT

A positioning protrusion 14 is provided in a center of an outer diameter surface of a halved outer ring 11a in both circumferential and axial directions. The positioning protrusion 14 is configured to engage with a housing, which is placed on an outer diameter side of the halved outer ring, to position the halved outer ring 11a with respect to the housing. A protruding portion 17a and a recessed portion 17b are provided in each abutting portions 16a, 16b where a pair of the halved outer rings 11a abut on each other when fitted on a rotary shaft that is supported by a roller bearing. The protruding portion 17a and the recessed portion 17b are configured to mesh with each other to restrict axial movement of both halved outer rings 11a. The protruding portion 17a and the recessed portion 17b are point-symmetric with respect to a center 20 of the positioning protrusion 14.

11 Claims, 6 Drawing Sheets

(51) Int. Cl.
  *F16C 19/46* (2006.01)
  *F16C 33/60* (2006.01)
  *F16C 33/66* (2006.01)
  *F16C 35/067* (2006.01)
  *F16C 33/58* (2006.01)

(52) U.S. Cl.
  CPC ........ *F16C 33/6659* (2013.01); *F16C 35/067* (2013.01); *F16C 2226/50* (2013.01); *F16C 2226/76* (2013.01)

(56) References Cited

U.S. PATENT DOCUMENTS

| | | | |
|---|---|---|---|
| 3,244,463 A | | 4/1966 | Bowen, III et al. |
| 4,820,062 A | * | 4/1989 | Shirane .......................... 384/486 |
| 8,061,716 B2 | * | 11/2011 | Wirt ............................. 277/631 |
| 2005/0265644 A1 | | 12/2005 | Waseda |
| 2008/0131041 A1 | * | 6/2008 | Nakano et al. ............... 384/127 |
| 2011/0064350 A1 | * | 3/2011 | Yamakawa et al. .......... 384/577 |

FOREIGN PATENT DOCUMENTS

| | | |
|---|---|---|
| JP | 2003-314563 | 11/2003 |
| JP | 2005-090696 | 4/2005 |
| JP | 2005-180459 | 7/2005 |
| JP | 2005-337352 | 12/2005 |
| JP | 2007-032671 | 2/2007 |
| JP | 2007-139154 | 6/2007 |
| JP | 2007-247815 | 9/2007 |
| JP | 2008-232309 | 10/2008 |
| WO | 2008/029713 | 3/2008 |

* cited by examiner

HALVED OUTER RING, ROLLER BEARING, AND ROTARY SUPPORT STRUCTURE

TECHNICAL FIELD

The present invention relates to halved outer rings, roller bearings, and rotary shaft support structures, and more particularly to halved outer rings that are fitted on the outer diameter side of a rotary shaft, roller bearings including such halved outer rings, and rotary shaft support structures.

BACKGROUND ART

Shell type needle bearings capable of receiving high load despite of its small bearing projected area, and having high rigidity are used in some applications as bearings that support a camshaft or a crankshaft. Halved outer rings formed by dividing an annular outer ring into halves and having a substantially semicylindrical shape are sometimes used as outer rings included in the shell type needle bearings. In such a shell type needle bearing, a single annular outer ring can be formed by fitting a pair of halved outer rings on the outer diameter side of a shaft (a rotary shaft), and causing abutting portions located at respective circumferential ends of the halved outer rings to abut on each other. In the shell type needle bearings having such a configuration, the outer ring can be fitted on the shaft with an improved fitting property.

Roller bearings having such halved outer rings are disclosed in U.S. Pat. No. 1,921,488 (Patent Literature 1), Japanese Patent Publication No. 2005-90696 of Unexamined Applications (Patent Literature 2), Japanese Patent Publication No. 2005-180459 of Unexamined Applications (Patent Literature 3), Japanese Patent Publication No. 2005-337352 of Unexamined Applications (Patent Literature 4), and Japanese National Publication No. 2002-525533 (Patent Literature 5).

In Patent Literature 1, a single annular outer ring is formed by combining a first halved outer ring with a second halved outer ring. The first halved outer ring has, at both circumferential ends thereof, V-shaped abutting portions protruding in the circumferential direction, and the second halved outer ring has, at both circumferential ends thereof, V-shaped abutting portions recessed in the circumferential direction.

In Patent Literatures 2 and 3, a race plate (a halved outer ring) has one circumferential end having a wedge shape as one abutting portion, and the other circumferential end having a valley shape as the other abutting portion. A cylindrical outer race is formed by a pair of such race plates by combining the wedge-shaped abutting portion of one of the race plates with the valley-shaped abutting portion of the other race place, and combining the valley-shaped abutting portion of the one race plate with the wedge-shaped abutting portion of the other race plate. That is, the pair of race plates have the same shape in Patent Literatures 2 and 3.

In Patent Literature 4, a halved outer ring has one circumferential end formed in protruding and recessed shapes having an inclined portion that is inclined with respect to a line extending along the axial direction, and an inclined portion that is inclined in the opposite direction from the inclined portion. An annular outer ring is formed by causing the respective protruding and recessed shapes of the pair of halved outer rings to abut on each other. In Patent Literature 4 as well, the pair of halved outer rings have the same shape. Note that the outer diameter surface of each halved outer ring is an arc-shaped surface having neither a protrusion nor a recess. In Patent Literature 5, a first halved outer ring has protrusions formed at its one circumferential end, and a second halved outer ring has cutouts formed at its one circumferential end, so that the protrusions are elastically snap-engaged with the cutouts. Note that the other circumferential ends of the first and second halved outer rings are coupled together in advance.

CITATION LIST

Patent Literatures

PLT1: U.S. Pat. No. 1,921,488
PLT2: Japanese Patent Publication No. 2005-90696 of Unexamined Applications
PLT3: Japanese Patent Publication No. 2005-180459 of Unexamined Applications
PLT4: Japanese Patent Publication No. 2005-337352 of Unexamined Applications
PLT5: Japanese National Publication No. 2002-525533

SUMMARY OF INVENTION

Technical Problem

In Patent Literatures 1 and 5, two halved outer rings having different shapes need to be prepared, thereby reducing productivity. In Patent Literatures 2, 3, and 4, halved outer rings having the same shape can be combined to form an annular outer ring. In Patent Literatures 2 and 3, however, the halved outer rings need be combined in the right direction when being fitted on a rotary shaft. Thus, for example, if the halved outer rings are combined in a wrong direction such that the abutting portions each having a circumferentially protruding portion are caused to abut on each other, the halved outer rings cannot be properly fitted on the rotary shaft. Such a need to combine the halved outer rings in the right direction makes it difficult to fit the halved outer rings on the rotary shaft.

When placing halved outer rings on the outer diameter side of a rotary shaft, the halved outer rings need be positioned with respect to a housing that is placed on the outer diameter side of the halved outer rings. In Patent Literature 4, however, the outer diameter surface of each halved outer ring is an arc-shaped surface having neither a protrusion nor a recess, thereby making it difficult to properly position the halved outer rings.

It is an object of the present invention to provide a halved outer ring capable of being properly positioned with respect to a housing, and capable of facilitating fitting of the halved outer ring on a rotary shaft.

It is another object of the present invention to provide a roller bearing capable of properly positioning a halved outer ring with respect to a housing, and capable of facilitating fitting of the roller bearing on a rotary shaft. It is still another object of the present invention to provide a rotary shaft support structure capable of properly positioning a halved outer ring with respect to a housing, and allowing a roller bearing to be easily fitted on a rotary shaft.

Solution to Problem

A halved outer ring according to the present invention is a halved outer ring included in a roller bearing and having a substantially semicylindrical shape, including: a positioning portion provided in a center of an outer diameter surface in both circumferential and axial directions, and configured to engage with a housing, which is placed on an outer diameter side of the halved outer ring, to position the halved outer ring with respect to the housing, wherein protruding and recessed shapes are provided in abutting portions where a pair of the halved outer rings abut on each other when fitted on a rotary shaft that is supported by the roller bearing, and the protruding and recessed shapes are configured to mesh with each other to restrict axial movement of the halved outer rings, and the protruding and recessed shapes are point-symmetric with respect to a center of the positioning portion.

With this configuration, the positioning portion provided in the center of the outer diameter surface in the circumferential and axial directions can be used to engage the halved outer ring with the housing that is placed on the outer diameter side of the halved outer ring. Thus, the halved outer ring can be properly positioned with respect to the housing. Moreover, the protruding and recessed shapes, which are provided in the abutting portions where the pair of halved outer rings abut on each other, and which mesh with each other to restrict axial movement of the halved outer rings when the pair of halved outer rings are fitted on the rotary shaft that is supported by the roller bearing, are point-symmetric with respect to the center of the positioning protrusion. This allows the halved outer rings to be fitted on the rotary shaft from any direction. It is therefore not necessary to consider the direction of the halved outer rings when fitting the halved outer rings on the rotary shaft, thereby facilitating fitting of the halved outer rings on the rotary shaft.

Preferably, when the abutting portion is viewed from the outer diameter side, the protruding shape is formed by a first line extending straight in the circumferential direction, and a second line extending from an outer circumferential end of the first line to one axial end of the halved outer ring, and the recessed shape is formed by the first line and a third line extending from an inner circumferential end of the first line to the other axial end of the halved outer ring.

This configuration allows deformation of the halved outer ring to be controlled by using a gap that is formed between the first line included in one of the halved outer rings and the first line included in the other halved outer ring when the pair of halved outer rings are combined.

The pair of halved outer rings need be combined by causing their respective circumferential ends to abut on each other. In this case, any interference in the abutting portion hinders proper fitting of the halved outer rings on the rotary shaft. In dimension control of the abutting portions, it is difficult to control the dimensions of the abutting portions that are shaped as shown in Patent Literatures 1 to 5 described above. That is, it is difficult to properly control the dimensions of the abutting portions to properly fit the pair of halved outer rings on the rotary shaft.

For example, in Patent Literatures 1, 2, and 3 disclosing the halved outer rings having V-shaped abutting portions, and Patent Literature 4 disclosing the halved outer ring having an inclined portion inclined in one direction and an inclined portion inclined in the opposite direction, it is difficult to accurately measure the position of the vertex of the V shape, that is, the most protruding position in the circumferential direction or the most recessed position in the circumferential direction. Thus, when the pair of halved outer rings are combined, the positions of the vertices of the V shapes may not match between the pair of halved outer rings, and the pair of halved outer rings may be fitted on the rotary shaft in this state. Moreover, the dimensions of the abutting portions may be different between the circumferential ends. That is, there may be a case where the pair of halved outer rings can properly abut on each other in the abutting portion on one side, but cannot properly abut on each other in the abutting portion on the other side. In this case, a rolling surface, which is formed by the inner diameter surface of each outer ring and is configured so that a plurality of rollers roll thereon, cannot be properly formed. In Patent Literature 5, in order to control the dimensions of the abutting portions, the dimensions need to be measured at a plurality of positions due to the snap fitting, thereby making the dimension control difficult.

It is a further object of the present invention to provide a halved outer ring whose dimensions can be easily controlled.

According to another aspect of the present invention, a halved outer ring is a halved outer ring included in a roller bearing and having a substantially semicylindrical shape. The halved outer ring includes protruding and recessed shapes provided in abutting portions where a pair of the halved outer rings abut on each other when incorporated in the roller bearing, and configured to mesh with each other to restrict axial movement of the halved outer rings. When the abutting portion is viewed from an outer diameter side, the protruding shape is formed by a first line extending straight in a circumferential direction, and a second line extending from an outer circumferential end of the first line to one axial end of the halved outer ring. The recessed shape is formed by the first line and a third line extending from an inner circumferential end of the first line to the other axial end of the halved outer ring.

With this configuration, dimensions of the abutting portion of the halved outer ring can be properly controlled by measuring an axial length of the protruding shape, that is, an axial length from the first line to the one axial end. In this case, since the first line that forms the protruding shape is shaped to extend straight in the circumferential direction, the axial length dimension from the one axial end of the halved outer ring to the first line can be easily measured. Thus, by controlling the difference in axial length of the protruding shape between the halved outer rings, the halved outer rings can be properly fitted on a rotary shaft while avoiding interference of the abutting portion.

Preferably, a positioning portion is provided in a center of an outer diameter surface in both the circumferential direction and an axial direction, and is configured to engage with a housing, which is placed on the outer diameter side of the halved outer ring, to position the halved outer ring with respect to the housing. This allows the halved outer ring to be positioned, specifically, allows axial movement and circumferential movement of the halved outer ring to be restricted. Thus, the halved outer ring can be properly positioned with respect to the housing.

More preferably, the second and third lines are inclined with respect to a line extending in the axial direction.

The second and third lines may extend straight in the axial direction.

Each of the second and third lines may have a line extending straight in the axial direction, and a line inclined with respect to the line extending in the axial direction.

More preferably, the positioning portion is shaped to protrude from the outer diameter surface toward the outer diameter side. This can facilitate processing of a portion that engages with the positioning portion in the housing that is placed on the outer diameter side of the halved outer ring.

More preferably, the positioning portion is provided with a through hole extending through the positioning portion in a radial direction. This allows lubricating oil to flow in the radial direction of the halved outer ring through the through hole.

More preferably, the halved outer ring further includes a flange portion extending from an axial end toward an inner diameter side. Thus, axial movement of a plurality of rollers and a cage, which are placed on the inner diameter side of the halved outer ring, can be restricted.

More preferably, the halved outer ring is manufactured by bending a flat plate-like steel material into the substantially semicylindrical shape. This allows the halved outer ring having the above configuration to be inexpensively manufactured.

As a more preferred embodiment, the steel material has a carbon content of 0.3 wt % or less, and the halved outer ring is subjected to a carburizing quenching treatment. Thus, the steel material can be easily bent in a bending process, and hardness of the halved outer ring can be increased.

According to still another aspect of the present invention, a roller bearing includes: a pair of any one of the halved outer rings described above; a plurality of rollers configured to roll on respective inner diameter surfaces of the pair of halved outer rings; and a cage configured to hold the plurality of rollers.

Such a roller bearing is capable of properly positioning the halved outer rings with respect to the housing, and can facilitate fitting of the halved outer rings on the rotary shaft.

According to a further aspect of the present invention, a rotary shaft support structure includes: a rotary shaft; the roller bearing configured to support the rotary shaft; and a housing placed on the outer diameter side of the pair of halved outer rings, and including a housing engagement portion configured to engage with the positioning portion.

Such a rotary shaft support structure is capable of properly positioning the halved outer rings with respect to the housing, and can facilitate fitting of the roller bearing on the rotary shaft.

Advantageous Effects of Invention

The positioning portion provided in the center of the outer diameter surface in both the circumferential and axial directions can be used to engage the halved outer ring of the present invention configured as described above with the housing that is placed on the outer diameter side of the halved outer ring. Thus, the halved outer ring can be properly positioned with respect to the housing. The protruding and recessed shapes are provided in the abutting portions where the pair of halved outer rings abut on each other, and are configured to mesh with each other to restrict axial movement of the halved outer rings when the pair of halved outer rings are fitted on the rotary shaft that is supported by the roller bearing. Since the protruding and recessed shapes are point-symmetric with respect to the center of the positioning portion, the halved outer rings can be fitted on the rotary shaft from any direction. It is therefore not necessary to consider the direction of the halved outer rings when fitting the halved outer rings on the rotary shaft. This can facilitate fitting of the halved outer rings on the rotary shaft.

The roller bearing of the present invention allows the halved outer rings to be properly positioned with respect to the housing, and also can facilitate fitting of the roller bearing on the rotary shaft. The rotary shaft support structure of the present invention allows the halved outer rings to be properly positioned with respect to the housing, and allows the roller bearing to be easily fitted on the rotary shaft.

DESCRIPTION OF EMBODIMENTS

Figure 1:
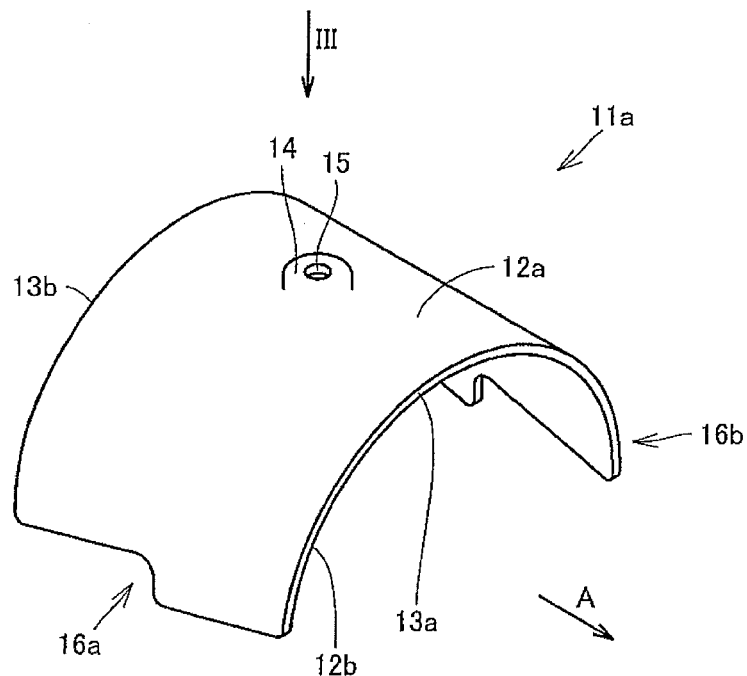
FIG. 1 is a perspective view showing a halved outer ring of an embodiment of the present invention.
Figure 2:
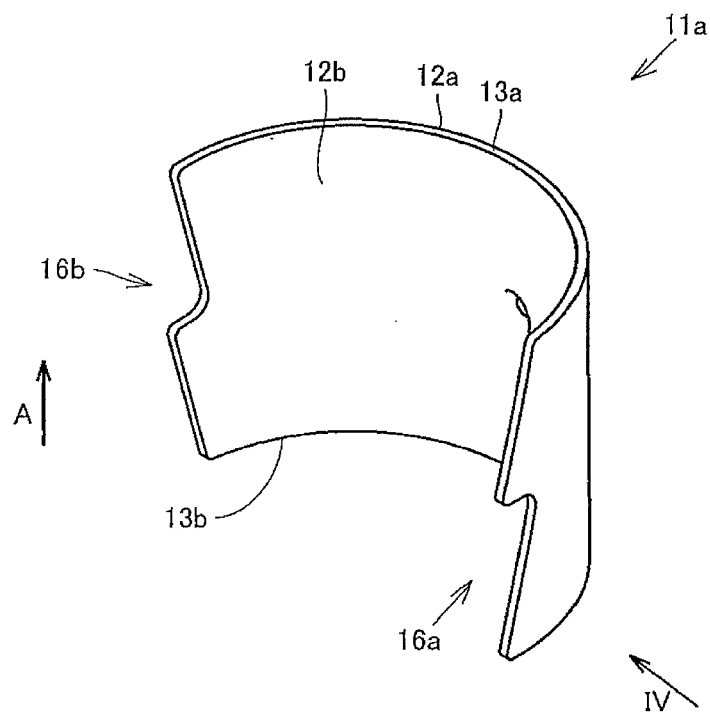
FIG. 2 is a perspective view showing the halved outer ring of FIG. 1 inclined by 90 degrees.
Figure 3:
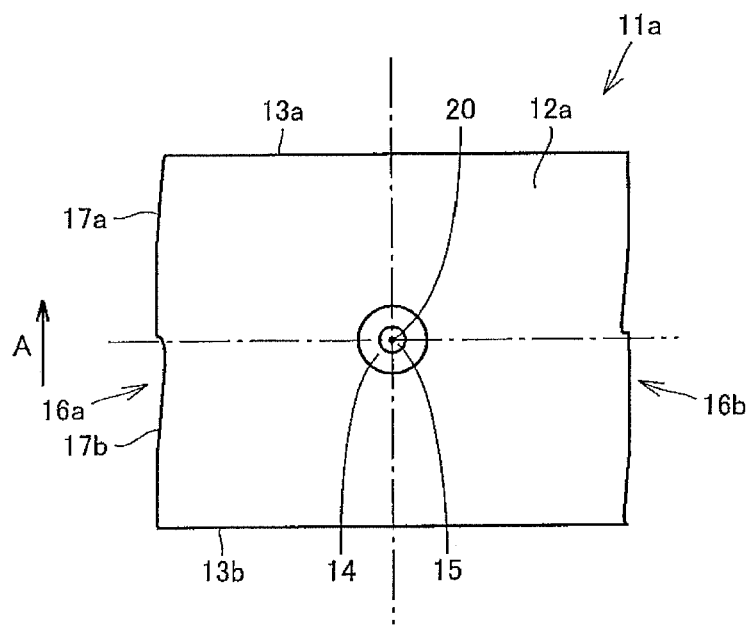
FIG. 3 is a plan view showing a circumferential central portion of the halved outer ring of FIGS. 1 and 2 as viewed from the outer diameter side.
Figure 4:
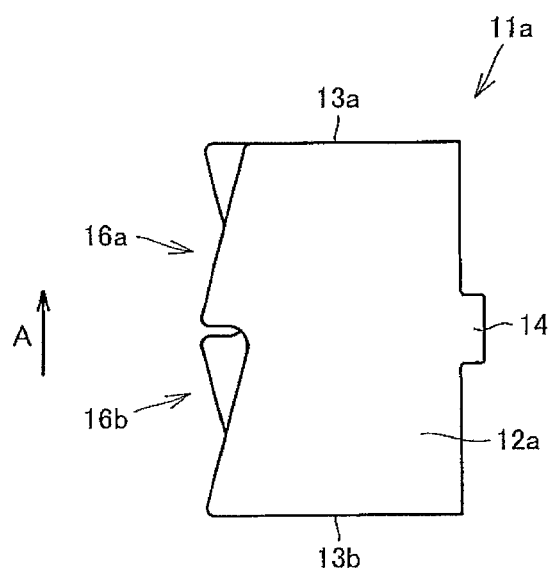
FIG. 4 is a plan view showing circumferential ends of the halved outer ring of FIGS. 1 and 2 as viewed from the outer diameter side.

Embodiments of the present invention will be described below with reference to the accompanying drawings. FIGS. 1 and 2 are perspective views showing a halved outer ring 11a according to an embodiment of the present invention. FIG. 2 is a diagram of the halved outer ring 11a of FIG. 1 rotated by 90 degrees. FIGS. 3 and 4 are plan views of the halved outer ring 11a of FIGS. 1 and 2 as viewed from the outer diameter side. FIG. 3 is a diagram showing a circumferential central portion of the halved outer ring 11a as viewed from the outer diameter side, and FIG. 4 is a diagram showing circumferential ends of the halved outer ring 11a as viewed from the outer diameter side. Note that FIG. 3 is a diagram as viewed from the direction shown by arrow III in FIG. 1, and FIG. 4 is a diagram as viewed from the direction shown by arrow IV in FIG. 2. Arrow A in FIGS. 1 to 4 represents one direction of the axial direction.

Referring to FIGS. 1 to 4, the halved outer ring 11a has a substantially semicylindrical shape formed by cutting a cylindrical member having a predetermined thickness along a plane including the central axis of the cylindrical member. Specifically, an outer diameter surface 12a and an inner diameter surface 12b of the halved outer ring 11a have a substantially semicircular shape when the halved outer ring 11a is viewed from the axial direction. Neither of axial ends 13a, 13b of the halved outer ring 11a has a portion that is bent in the radial direction or protrudes in the radial direction, and both of the axial ends 13a, 13b of the halved outer ring 11a are shaped to extend straight in the axial direction. A pair of such halved outer rings 11a having the same shape are combined to form one annular outer ring. As described later, a plurality of rollers roll on the inner diameter surfaces 12a of the combined pair of halved outer rings 11a. That is, the inner diameter surfaces 12a of the halved outer rings 11a serve as a rolling surface on which the plurality of rollers roll.

In each halved outer ring 11a, a positioning protrusion 14 is provided in the center of the outer diameter surface 12a in both the circumferential and axial directions. The positioning protrusion 14 engages with a housing (not shown) that is placed on the outer diameter side of the halved outer ring 11a, and positions the halved outer ring 11a with respect to the housing. Specifically, the positioning protrusion 14 engages with a recessed housing engagement portion provided in the housing. The housing and the housing engagement portion will be described later. Engaging the positioning protrusion 14 with the housing engagement portion restricts movement of the halved outer ring 11a, specifically axial movement and circumferential movement of the halved outer ring 11a, thereby allowing the halved outer ring 11a to be positioned with respect to the housing. Thus, the positioning protrusion 14 provided in the center of the outer diameter surface 12a in both the circumferential and axial directions can be used to properly engage the halved outer ring 11a with the housing located on the outer diameter side of the halved outer ring 11a.

The positioning protrusion 14 is shaped to protrude from the outer diameter surface 12a toward the outer diameter side. This configuration can facilitate processing of a portion to be engaged with the positioning protrusion 14 in the housing that is placed on the outer diameter side of the halved outer ring 11a. That is, the housing engagement portion provided in the housing need only be shaped to be recessed from the inner diameter surface of the housing, on which the halved outer ring 11a is to be placed, toward the outer diameter side. The positioning protrusion 14 is provided so as to extend straight from the outer diameter surface 12a toward the outer diameter side. The positioning protrusion 14 has a round outer shape as viewed from the outer diameter side (see FIG. 3).

The positioning protrusion 14 is provided with a through hole 15 extending through the positioning protrusion 14 in the radial direction. The through hole 15 is provided in the radial center of the positioning protrusion 14. The through hole 14 is a round hole. The through hole 15 is also provided so as to extend straight from the inner diameter surface 12b of the halved outer ring 11a toward the outer diameter side. That is, the positioning protrusion 14 having the through hole 15 in the radial center thereof has a substantially cylindrical shape. This allows lubricating oil to flow in the radial direction of the halved outer ring 11a through the through hole 15. Note that the positioning protrusion 14 and the through hole 15 are provided by a burring process described below.

Figure 5:
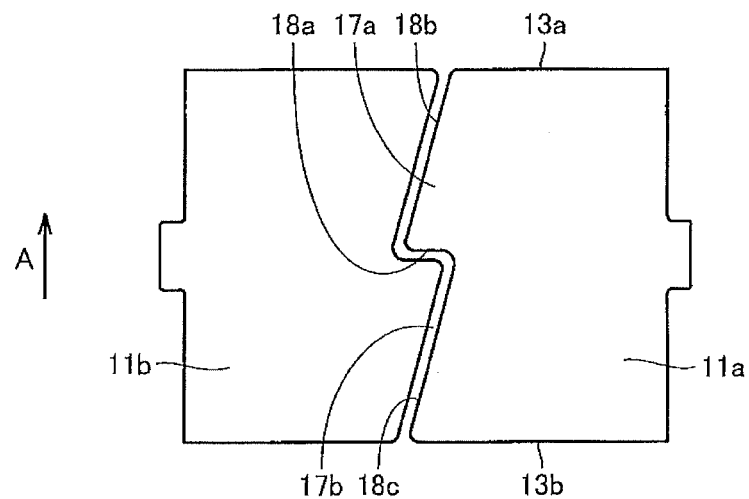
FIG. 5 is a diagram showing the state in which respective circumferential ends of a pair of halved outer rings abut on each other.
Figure 6:
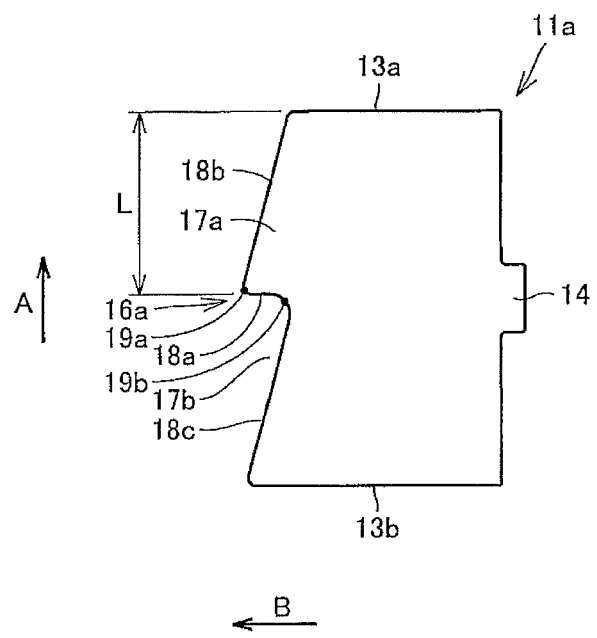
FIG. 6 is a diagram showing only an abutting portion on one side of the halved outer ring, where illustration of the other abutting portion on the other side thereof is omitted.

The shape of abutting portions will be described below. The abutting portions are portions where a pair of halved outer rings 11a, 11b abut on each other when the pair of halved outer rings 11a, 11b are fitted on a rotary shaft that is supported by a roller bearing described later. FIG. 5 shows the state in which respective circumferential ends of the pair of halved outer rings 11a, 11b abut on each other. FIG. 6 is a diagram showing only the halved outer ring 11a, and corresponds to FIG. 4. In order to facilitate understanding, the combined pair of halved outer rings 11a, 11b are shown slightly separated from each other in FIG. 5. Note that the halved outer ring 11b has the same shape as the halved outer ring 11a. In order to facilitate understanding, only an abutting portion 16a on one side is shown in FIGS. 5 and 6, and an abutting portion 16b on the other side is not shown.

Referring to FIGS. 1 to 6, the abutting portion 16a has a protruding portion 17a and a recessed portion 17b, so that when the pair of halved outer rings 11a, 11b abut on each other, the protruding portion 17a meshes with the recessed portion 17b to restrict axial movement of the halved outer rings 11a, 11b. The protruding portion 17a is shaped to protrude outward in the circumferential direction, that is, to protrude in the direction shown by arrow B in FIG. 6, and the recessed portion 17b is shaped to be recessed relatively inward in the circumferential direction as compared to the protruding portion 17a, that is, to be recessed in the direction opposite to the direction shown by arrow B in FIG. 6. There is a so-called stepped portion between the protruding portion 17a and the recessed portion 17b.

When the abutting portion 16a is viewed from the radial direction, specifically from the outer diameter side, the protruding portion 17a is formed by a first line 18a extending straight in the circumferential direction, and a second line 18b extending from an outer circumferential end 19a of the first line 18a to the one axial end 13a of the halved outer ring 11a. The recessed portion 17b is formed by the first line 18a and a third line 18c extending from an inner circumferential end 19b of the first line 18a to the other axial end 13b of the halved outer ring 11a.

That is, the abutting portion 16a includes the first line 18a extending straight in the circumferential direction, the second line 18b extending from the outer circumferential end 19a of the first line 18a to the one axial end 13a of the halved outer ring 11a, and the third line 18c extending from the inner circumferential end 19b of the first line 18a to the other axial end 13b of the halved outer ring 11a. The protruding portion 17a is formed by the first and second lines 18a, 18b, and the recessed portion 17b is formed by the first and third lines 18a, 18c.

Note that the second and third lines 18b, 18c are inclined with respect to a line extending in the axial direction. In this example, the second and third lines 18b, 18c are inclined in the same direction. That is, the angle of the second line 18b with respect to the first line 18a is the same as the angle of the third line 18c with respect to the first line 18a. Note that the first line 18a is connected to both the second line 18b and the third line 18c so as to form a smooth continuous line. That is, there is a curve between the first line 18a and the second line 18b and between the first line 18a and the third line 18c.

This configuration allows the dimensions of the abutting portion 16a of the halved outer ring 11a to be properly controlled by measuring the axial length of the protruding portion 17a shown by a length dimension L in FIG. 6, namely the axial length from the first line 18a to the one axial end 13a. In this case, since the first line 18a that forms the protruding portion 17a is shaped to extend straight in the circumferential direction, the axial length dimension from the one axial end 13a of the halved outer ring 11a to the first line 18a can be easily measured. Thus, controlling the difference in axial length between the respective protruding shapes of the halved outer rings 11a allows proper fitting of the halved outer rings 11a while avoiding interference in the abutting portion 16a. That is, the above configuration facilitates dimension control.

The protruding and recessed shapes, namely the protruding portions 17a and the recessed portions 17b of the abutting portions 16a, 16b, are point-symmetric with respect to the center 20 of the positioning protrusion 14 (see FIG. 3). That is, the protruding and recessed shapes of the abutting portions 16a, 16b look the same when the halved outer ring 11a is rotated by 180 degrees about the center 20 of the positioning protrusion 14.

With this configuration, the protruding and recessed shapes, which are provided in the abutting portions 16a, 16b of the pair of halved outer rings 11a, 11b, and which mesh with each other to restrict axial movement of both halved outer rings 11a, 11b when the pair of halved outer rings 11a, 11b are fitted on the rotary shaft that is supported by the roller bearing, are point-symmetric with respect to the center 20 of the positioning protrusion 14. This allows the halved outer ring 11a to be fitted on the rotary shaft from any direction. It is therefore not necessary to consider the direction of the halved outer ring 11a when fitting the halved outer ring 11a on the rotary shaft.

In the halved outer ring 11a having the above configuration, the protruding portion 17a and the recessed portion 17b are formed by the first line 18a extending straight in the circumferential direction, the second line 18b extending from the outer circumferential end 19a of the first line 18a to the one axial end 13a of the halved outer ring 11a, and the third line 18c extending from the inner circumferential end 19b of the first line 18a to the other axial end 13b of the halved outer ring 11a. This allows deformation of the halved outer ring 11a to be controlled by using a gap formed between the pair of halved outer rings 11a, 11b.

Figure 7:
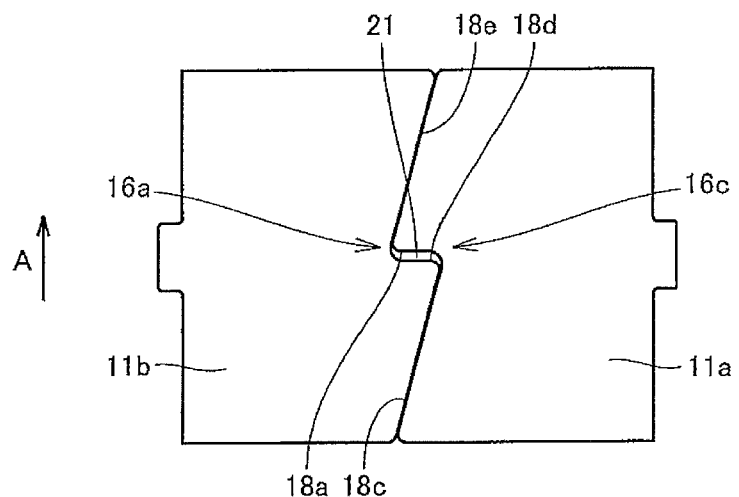
FIG. 7 is a diagram showing the state in which the pair of halved outer rings abut on each other.

This will be specifically described. FIG. 7 is a diagram showing the state in which the pair of halved outer rings 11a, 11b abut on each other. Referring to FIG. 7, a gap 21 is formed between the abutting portion 16a of the halved outer ring 11a and an abutting portion 16b of the halved outer ring 11b, which are positioned so as to mesh with each other. Specifically, this gap 21 is formed between the first and third lines 18a, 18c that form the outer shape of the halved outer ring 11a, and first and third lines 18d, 18e that form the outer shape of the halved outer ring 11b. This gap 21 has substantially a shape of a parallelogram. The degree of deformation of the halved outer shapes 11a, 11b can be controlled by controlling the gap 21.

Specifically, for example, if the halved outer ring 11a is deformed such that both circumferential ends are opened, the interval between the first lines 18a, 18d extending straight in the circumferential direction in the gap 21 in FIG. 7, namely the axial length dimension of the gap 21, changes due to the deformation. Thus, the degree of deformation of the halved outer rings can be controlled by checking if the axial length dimension of the gap 21 is in a predetermined range or not. It is very difficult to apply this control method to such halved outer rings having V-shaped abutting portions as described in Patent Literatures 1 to 3. This is because a portion that changes due to such deformation is not clear in the halved outer rings having V-shaped abutting portions.

A manufacturing method of the halved outer ring 11a having the above configuration will be described below. First, a flat plate-like steel material having a predetermined thickness is prepared. A steel material having a carbon content of 0.3 wt % or less is preferable because such a steel material is relatively soft before a heat treatment, and can be easily bent into a substantially semicylindrical shape in a later step.

Figure 8:
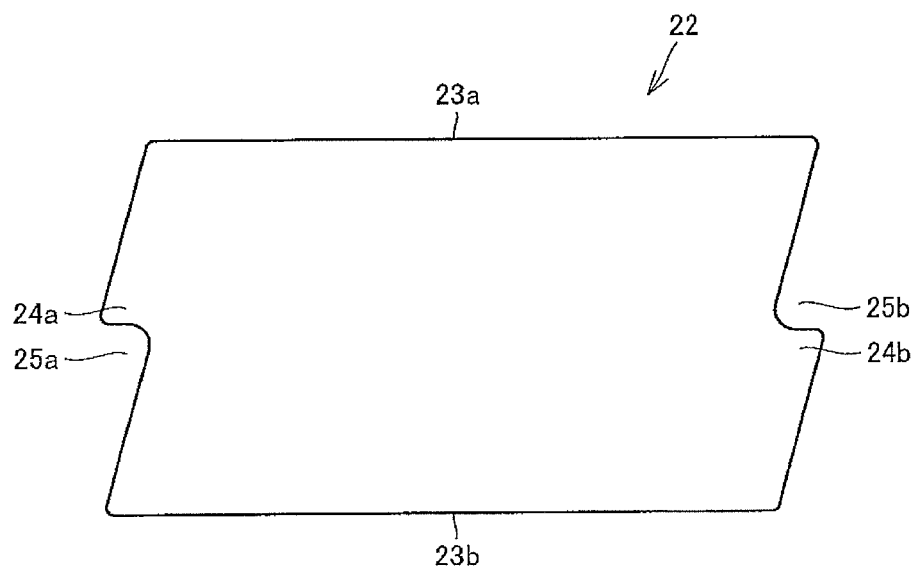
FIG. 8 is a diagram showing an outer shape of a steel material punched out.

Such a steel material is prepared, and is punched out. The outer shape of a steel material 22 thus punched out is shown in FIG. 8. Specifically, the outer shape is punched out so as to form regions 23a, 23b that will later serve as the axial ends, regions 24a, 24b that will later serve as the protruding portions provided in both circumferential ends, and regions 25a, 25b that will later serve as the recessed portions provided in both circumferential ends. Then, the positioning protrusion is formed by a burring process in the center in both directions that will be the circumferential and axial directions, respectively. In this example, when forming the positioning portion by the burring process, a through hole extending through the steel material 22 in the thickness direction is provided in the center of the positioning portion. Then, the steel material 22 is bent into a substantially semicylindrical shape. Thereafter, a heat treatment such as a carbonitriding treatment is performed. This can increase hardness. The halved outer ring 11a of the embodiment of the present invention is manufactured in this manner. Such a halved outer ring 11a can be inexpensively manufactured as it is manufactured by bending a flat plate-like steel material.

Figure 9:
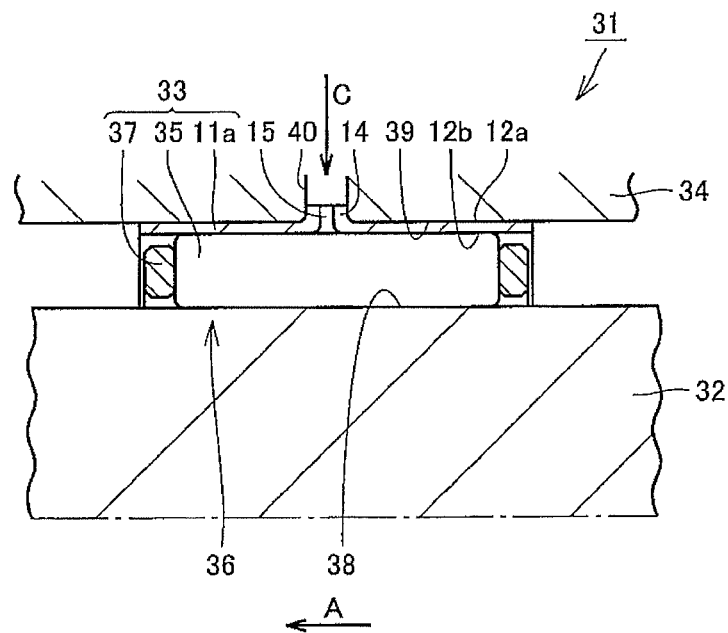
FIG. 9 is a cross-sectional view showing a part of a rotary shaft support structure including a roller bearing having halved outer rings according to an embodiment of the present invention.

A configuration of a rotary shaft support structure including a roller bearing having halved outer rings according to an embodiment of the present invention will be described below. FIG. 9 is a cross-sectional view showing a part of the rotary shaft support structure including the roller bearing having the halved outer rings according to the embodiment of the present invention. Referring to FIG. 9, a rotary shaft support structure 31 of the embodiment of the present invention includes a rotary shaft 32 such as a camshaft or a crankshaft, a roller bearing 33 that supports the rotary shaft 32, and a housing 34 that is placed on the outer diameter side of the roller bearing 33, specifically on the outer diameter side of a halved outer ring 11a included in the roller bearing 33.

The roller bearing 33 has a pair of halved outer rings 11a, a plurality of rollers 35 that roll on inner diameter surfaces 12b of the pair of halved outer rings 11a as rolling surfaces, and a cage 37 that has a pocket 36 accommodating the plurality of rollers 35 and holds the plurality of rollers 35. Note that although the pair of halved outer rings 11a are combined as shown in FIG. 5, only one of the halved outer rings 11a is shown in FIG. 9 in order to facilitate understanding.

The outer diameter surface 12a of the halved outer ring 11a is provided so as to contact an inner diameter surface 39 of the housing 34, which is located on the side where the rotary shaft 32 and the roller bearing 33 are placed. Note that the halved outer ring 11a has the configuration described above. The rollers 35 roll on the inner diameter surface 12b of the halved outer ring 11a and an outer diameter surface 38 of the rotary shaft 32. For example, needle rollers are used as the rollers 35.

The cage 37 may be formed by combining a pair of cage members each having a substantially semicylindrical shape like the outer shape of the halved outer ring 11a. Thus, the cage 37 can also be fitted on the outer diameter side of the rotary shaft 32, thereby improving a fitting property of a bearing constituent member on the rotary shaft 32. The cage 37 may be configured so as to be elastically deformable, and may be configured so that a part of the cage 32 in the circumferential direction can be separated to allow the cage 32 to be fitted on the outer diameter side of the rotary shaft 32 by using elastic deformation. The fitting property is further improved by configuring the cage 37 so that the cage 37 can hold the plurality of rollers 35 in advance, namely before being fitted on the rotary shaft 32.

The housing 34 is provided with a housing engagement portion 40 that is recessed from the inner diameter surface 39 of the housing 34 to the outer diameter side of the rotary shaft 32 so as to engage with the positioning protrusion 14 of the halved outer ring 11a. The housing engagement portion 40 is recessed in the shape of a round hole so as to engage with the positioning protrusion 14 having a round shape. The halved outer ring 11a is fitted so that the positioning protrusion 14 engages with the housing engagement portion 40. In the housing engagement portion 40, lubricating oil is supplied from the direction shown by arrow C in FIG. 9, whereby the lubricating oil can be supplied into the roller bearing 33 through the through hole 15. Note that in the case of a shaft-center lubrication type, the lubricating oil is allowed to flow from the inside of the roller bearing 33 to the housing engagement portion 40 through the through hole 15 so as to be discharged in the direction opposite to that shown in arrow C in FIG. 9.

Since this roller bearing 33 has the halved outer rings 11a configured as described above, this roller bearing 33 allows the halved outer rings 11a to be properly positioned with respect to the housing 34, and can also facilitate fitting of the halved outer rings 11a on the rotary shaft 32.

Moreover, such a roller bearing 33 allows the pair of halved outer rings 11a to be properly fitted on the rotary shaft 32.

Since the rotary shaft support structure 31 includes the roller bearing 33 described above, the rotary shaft support structure 31 allows the halved outer rings 11a to be properly positioned with respect to the housing 34, and can also facilitate fitting of the roller bearing 33 on the rotary shaft 32.

Moreover, such a rotary shaft support structure 31 allows the pair of halved outer rings 11a included in the roller bearing 33 to be properly fitted on the rotary shaft 32.

Figure 10:
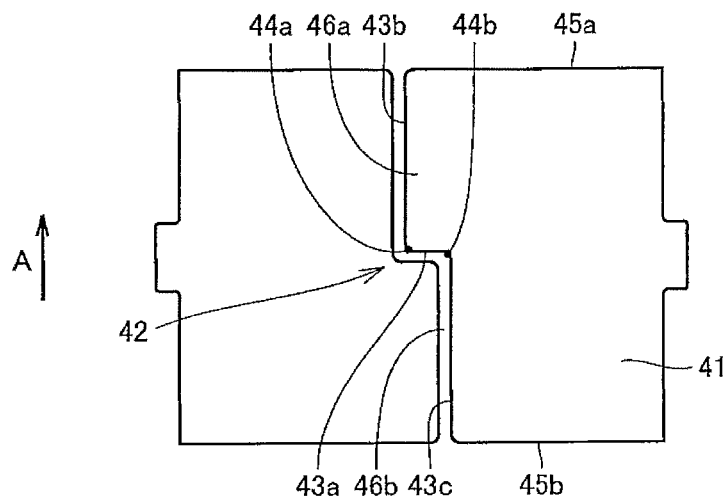
FIG. 10 is a diagram showing halved outer rings shaped so that second and third lines extend in the axial direction.

Note that in the above embodiment, the abutting portions of the halved outer ring are shaped so that the second and third lines are inclined with respect to the line extending in the axial direction. However, the present invention is not limited to this, and the second and third lines may extend straight in the axial direction. FIG. 10 shows a diagram showing the state in which such halved outer rings abut on each other, and corresponds to FIG. 5. Referring to FIG. 10, an abutting portion 42 provided in a halved outer ring 41 includes a first line 43a extending straight in the circumferential direction, a second line 43b extending from an outer circumferential end 44a of the first line 43a to one axial end 45a of the halved outer ring 41, and a third line 43c extending from an inner circumferential end 44b of the first line 43a to the other axial end 45b of the halved outer ring 41. A protruding portion 46a is formed by the first and second lines 43a, 43b, and a recessed portion 46b is formed by the first and third lines 43a, 43c. The second and third lines 43b, 43c are shaped to extend straight in the axial direction. This configuration can also produce the effect described above.

Figure 11:
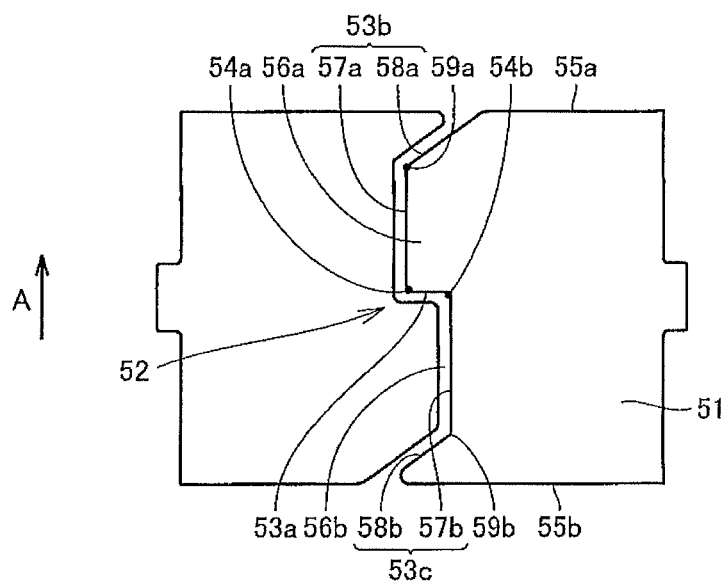
FIG. 11 is a diagram showing halved outer rings shaped so that each of second and third lines has a line extending straight in the axial direction and a line inclined with respect to the line extending in the axial direction.

As shown in FIG. 11, each of the second and third lines may have a line extending straight in the axial direction, and a line inclined with respect to the line extending in the axial direction. Specifically, referring to FIG. 11, an abutting portion 52 provided in a halved outer ring 51 includes a first line 53a extending straight in the circumferential direction, a second line 53b extending from an outer circumferential end 54a of the first line 53a to one axial end 55a of the halved outer ring 51, and a third line 53c extending from an inner circumferential end 54b of the first line 53a to the other axial end 55b of the halved outer ring 51. A protruding portion 56a is formed by the first and second lines 53a, 53b, and a recessed portion 56b is formed by the first and third lines 53a, 53c.

Each of the second and third lines 53b, 53c has a line 57a, 57b extending straight in the axial direction, and a line 58a, 58b inclined with respect to the line 57a, 57b extending in the axial direction. Specifically, the second line 53b is formed by the line 57a extending continuously from the outer circumferential end 54a of the first line 53a and straight in the axial direction, and the line 58a inclined with respect to the line 57a and extending straight from one axial end 59a of the line 57a to the one axial end 55a of the halved outer ring 51. The third line 53c is formed by the line 57b extending continuously from the inner circumferential end 54b of the first line 53a and straight in the axial direction, and the line 58b inclined with respect to the line 57b and extending straight from the other axial end 59b of the line 57b to the other axial end 55b of the halved outer ring 51. The lines 58a, 58b are inclined in the same direction. This configuration can also produce the effect described above.

Figure 12:
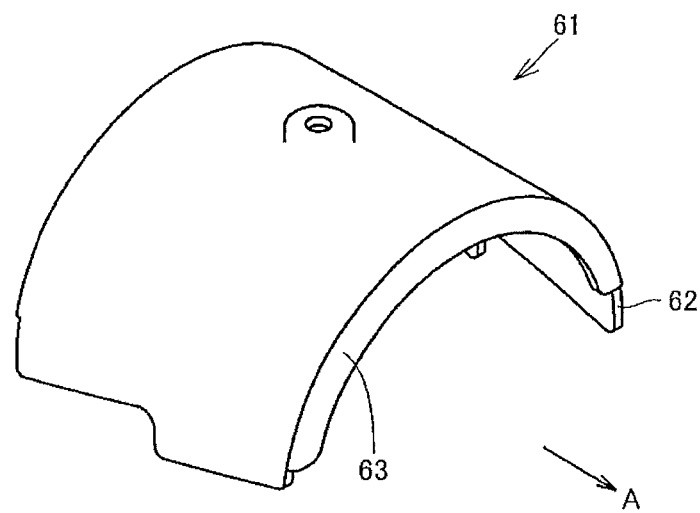
FIG. 12 is a perspective view showing a halved outer ring provided with a flange portion extending from an axial end toward the inner diameter side.

The halved outer ring may be provided with a flange portion extending from the axial end toward the inner diameter side. FIG. 12 is a perspective view of such a halved outer ring, and corresponds to FIG. 1. Referring to FIG. 12, a halved outer ring 61 is provided with a flange portion 63 extending from an axial end 62 toward the inner diameter side. The flange portion 63 extends straight from the axial end toward the inner diameter side. The flange portion 63 protrudes toward the inner diameter side by such an amount that the flange portion 63 does not interfere with the rotary shaft when the halved outer ring 61 is fitted on the rotary shaft. With this configuration, an axial end of a cage contacts the flange portion 63 even if the cage placed on the inner diameter side of the halved outer ring 61 is going to move in the axial direction. Thus, axial movement of the cage and the plurality of rollers held therein can be restricted. The circumferential length of the flange portion 63 is, e.g., at least half the circumferential length of the halved outer ring 61. Note that such a flange portion may be provided at both ends of the halved outer ring. A plurality of flange portions may be provided at one end of the halved outer ring.

Note that although the positioning protrusion has a round outer shape in the above embodiment, the present invention is not limited to this, and the positioning protrusion may have, e.g., a quadrangular or hexagonal outer shape. In this case, it is preferable that the outer shape of the positioning protrusion be point-symmetric with respect to the center of the positioning protrusion. Similarly, the through hole may have, e.g., a quadrangular or hexagonal shape. The outer shape of the positioning protrusion may be different from the shape of the through hole. The through hole may not be provided in the positioning protrusion. Note that the positioning protrusion may be provided by attaching another member to the outer diameter surface of the halved outer ring by welding, bonding, etc.

Although the positioning portion is shaped to protrude from the outer diameter surface of the halved outer shape toward the outer diameter side in the above embodiment, the present invention is not limited to this, and the positioning portion may be a through hole extending through the halved outer ring in the radial direction, or may be a recess that is recessed from the outer diameter surface and does not extend through the halved outer ring in the thickness direction. In this case, a protrusion protruding from the inner diameter surface of the housing toward the inner diameter side is provided so as to engage with the through hole or the recess, and the halved outer ring is positioned by engaging the protrusion with the through hole or the recess.

Note that although the halved outer ring is manufactured by bending a flat plate-like steel material into a substantially semicylindrical shape in the above embodiment, the present invention is not limited to this. The halved outer ring having the above configuration may be manufactured by processing a member that has already been formed into a semicylindrical shape. The halved outer ring having the above configuration may alternatively be manufactured by cutting. In the manufacturing process, the steel material is bent into the substantially semicylindrical shape after forming the positioning protrusion by a burring process. However, the positioning protrusion may be formed by the burring process after bending the steel material into the substantially semicylindrical shape.

Although the roller bearing is configured to include the cage in the above embodiment, the present invention is not limited to this, and is also applicable to a roller bearing of a type including no cage, namely a full type roller bearing. The roller bearing may be of a type including an inner ring. Although the embodiments of the present invention are described above with reference to the drawings, the present invention is not limited to the illustrated embodiments. Various modifications and variations can be made to the illustrated embodiments within a scope that is the same as, or equivalent to the present invention.

INDUSTRIAL APPLICABILITY

The halved outer ring, the roller bearing, and the rotary shaft support structure according to the present invention are effectively used for those rotary shafts on which it is difficult to fit the halved outer ring and the roller bearing from the axial direction, such as a camshaft, a crankshaft, etc.

REFERENCE SIGNS LIST 11a, 11b, 41, 51, 61 Halved outer ring
12a, 38 Outer diameter surface
12b, 39 Inner diameter surface
13a, 13b, 19a, 19b, 44a, 44b, 45a, 45b, 54a, 54b, 55a, 55b, 59a, 59b, 62 End
14 Positioning protrusion
15 Through hole
16a, 16b, 16c, 42, 52 Abutting portion
17a, 46a, 56a Protruding portion
17b, 46b, 56b Recessed portion
18a, 18b, 18c, 18d, 18e, 43a, 43b, 43c, 53a, 53b, 53c, 57a, 57b, 58a, 58b Line
20 Center
21 Gap
22 Steel material
23a, 23b, 24a, 24b, 25a, 25b Region
31 Rotary shaft support structure
32 Rotary shaft
33 Roller bearing
34 Housing
35 Roller
36 Pocket
37 Cage
40 Housing engagement portion
63 Flange portion

The invention claimed is:

1. A halved outer ring included in a roller bearing and having a substantially semicylindrical shape, comprising:
a positioning portion provided in a center of an outer diameter surface in both circumferential and axial directions, and configured to engage with a housing, which is placed on an outer diameter side of said halved outer ring, to position said halved outer ring with respect to said housing, wherein
protruding and recessed shapes are provided in abutting portions where each half of said halved outer ring abuts each other when fitted on a rotary shaft that is supported by said roller bearing, and said protruding and recessed shapes are configured to mesh with each other to restrict axial movement of said each half, and
said protruding and recessed shapes are point-symmetric with respect to a center of said positioning portion, wherein
when said abutting portions are viewed from said outer diameter side, said protruding shape is formed by a first line extending straight in said circumferential direction, and a second line extending from an outer circumferential end of said first line to one axial end of said halved outer ring, and said recessed shape is formed by said first line and a third line extending from an inner circumferential end of said first line of another axial end of said halved outer ring, and further wherein
the first line of the protruding shape is parallel to each of the axial ends of the halved outer ring and the center of the outer diameter surface for the positioning portion is defined by an intersection of first and second center lines, the first center line extending between the axial ends and being perpendicular to the axial ends and the second center line extending between the abutting portions and parallel to the axial ends, the center of the outer diameter surface located at a center of each of the first and second center lines, wherein a gap is formed between said halves, and along an entire length of said first lines of said protruding and said recessed shapes.

2. The halved outer ring according to claim 1, wherein said second and third lines are inclined with respect to a line extending in said axial direction.

3. The halved outer ring according to claim 1, wherein said second and third lines extend straight in said axial direction.

4. The halved outer ring according to claim 2, wherein each of said second and third lines has a line extending straight in said axial direction, and a line inclined with respect to said line extending in said axial direction.

5. The halved outer ring according to claim 1, wherein said positioning portion is shaped to protrude from said outer diameter surface toward said outer diameter side.

6. The halved outer ring according to claim 1, wherein said positioning portion is provided with a through hole extending through said positioning portion in a radial direction.

7. The halved outer ring according to claim 1, further comprising:
a flange portion extending from an axial end toward an inner diameter side.

8. The halved outer ring according to claim 1, wherein said halved outer ring is manufactured by bending a flat plate-like steel material into said substantially semicylindrical shape.

9. The halved outer ring according to claim 8, wherein said steel material has a carbon content of 0.3 wt % or less, and said halved outer ring is subjected to a carburizing quenching treatment.

10. A roller bearing, comprising:
the halved outer ring according to claim 1;
a plurality of rollers configured to roll on respective inner diameter surfaces of said halved outer ring; and
a cage configured to hold said plurality of rollers.

11. A rotary shaft support structure, comprising:
a rotary shaft;

said roller bearing according to claim 10 configured to support said rotary shaft; and a housing placed on said outer diameter side of said halved outer ring, and including a housing engagement portion configured to engage with said positioning portion.

\* \* \* \* \*